Jan. 2, 1962  E. HOFSTETTER ETAL  3,015,725
AXLE COUNTER FOR RAILROAD INSTALLATIONS
Filed June 3, 1960  2 Sheets-Sheet 1

Ernst Hofstetter
Kurt Haas
*INVENTORS*

BY *Walter S. Pleston*

*Attorney*

Jan. 2, 1962 E. HOFSTETTER ETAL 3,015,725
AXLE COUNTER FOR RAILROAD INSTALLATIONS
Filed June 3, 1960 2 Sheets-Sheet 2

INVENTORS:
Ernst Hofstetter
Kurt Haas
BY Walter S. Pleston
Attorney

United States Patent Office 3,015,725
Patented Jan. 2, 1962

3,015,725
AXLE COUNTER FOR RAILROAD
INSTALLATIONS
Ernst Hofstetter, Wallisellen, and Kurt Haas, Zurich, Switzerland, assignors to Societe Technique pour l'Industrie Nouvelle S.A. "Stin," Vevey, Switzerland
Filed June 3, 1960, Ser. No. 33,840
Claims priority, application Switzerland June 4, 1959
11 Claims. (Cl. 246—247)

Our present invention relates to axle counters for railroad installations and, more particularly, to apparatus for indicating the direction and/or number of railway cars traversing a length of track.

Heretofore, such axle counters generally comprised a balanced magnetic bridge circuit which was unbalanced by the successive passage of wheels through the field of an exciting magnet and, therefore, was capable of producing a signal responsive to the passage of each wheel. These bridge arrangements, however, were extremely susceptible to alteration of the exciting magnetic field by interfering magnetic fields resulting from electric currents passing through one of the rails which was included in the flux path. The rail currents generally derive from signaling circuits (e.g. block signals) or from the electromotive-traction circuits since the rails are frequently employed as the ground return for both the signal and the power circuits. The interfering magnetic field often was of the same order of magnitude as the exciting magnetic field.

It is an object of the present invention to provide an improved axle counter of relatively high sensitivity wherein the adverse effects of interfering magnetic fields are substantially obviated.

It is another object of the invention to provide an axle counter for railroad installations which is unaffected by rail currents.

An axle counter according to our invention comprises an exciting magnet whose field is included in the path of one wheel of each train axle, and a pair of detecting devices which are responsive to an alteration in the pattern of a magnetic flux and are disposed in the field of the exciting magnet. The detecting devices are arranged so as to be affected in an equal and opposite manner by the field in the absence of a wheel. Preferably, each one of these devices is positioned in an air gap between a pole of the magnet and the path of the passing wheels, the detecting devices being sensitive to a change in field intensity which results when the magnetic flux through such air gap is concentrated by a wheel of ferromagnetic material (e.g. steel) as the latter passes through the magnetic field. The detecting devices are suitable electromagnetic transducers (e.g. saturable-core transformers, magnetoresistive devices or Hall-effect cells) spacedly positioned in pairs along the rail, each pair being balanced so as to produce no output in the absence of a passing ferromagnetic body; upon such passage, however, two brief pulses are generated as first one and then the other transducer is predominantly affected by the increased flux so as to unbalance the connection. These pulses will be of opposite polarity (with direct-current energization) or phase (with alternating-current energization) so that one of them may be readily suppressed by conventional means. With A.-C. input the driving frequency should be high enough so that several cycles thereof will occur during the pulse generated by each passage of a wheel; an alternating current having a frequency of at least 100 cycles per second is found to be suitable, even for high-speed trains. Pulses thus produced by two separate transducer pairs, positioned next to each other along the rail, may be used to indicate by the order of their succession, in a manner known per se, the direction of travel of a passing train. It will be apparent that a detector circuit of this description responds to the presence of any paramagnetic or diamagnetic body, i.e. a body of a material having a permeability other than unity, in one of its air gaps.

According to another feature of our invention, we provide a conductive shunt, parallel to the rail and having substantially the same impedance as the latter, adapted to carry about half of the signal and traction currents normally passing through the rail. The axle-counting detecting devices and the exciting magnet or magnets therefor are then positioned between the rail and the shunt so that the interfering magnetic field surrounding the rail is countered by a substantially equal but opposite magnetic field produced by the shunt current.

Since the two branches of a magnetic flux path are generally not exactly identical, it has been found advantageous to provide means for trimming the exciting magnetic field to insure perfect balance. The trimmer may take the form of a ferromagnetic slug adjustably positioned in the stray field of each magnet.

The above and other objects, features and advantages of our invention will become more readily apparent from the following specific description of certain embodiments, reference being made to the accompanying drawing in which.

Figure 1:
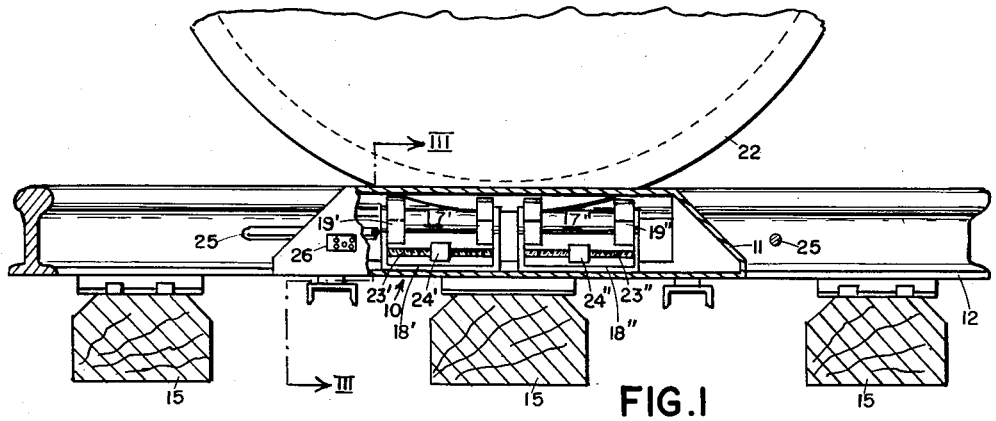
FIG. 1 is a side-elevational view, with parts broken away, of an axle counter according to the invention.
Figure 2:
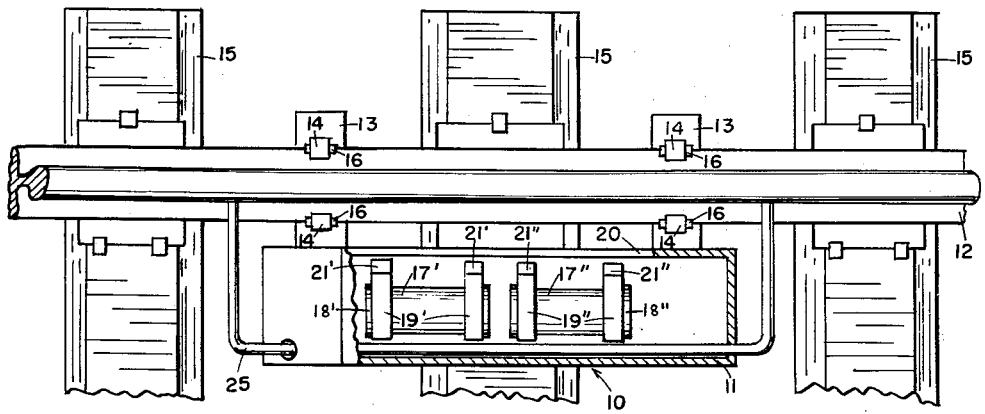
FIG. 2 is a top-plan view, partly in section, of the axle counter illustrated in FIG. 1.
Figure 3:
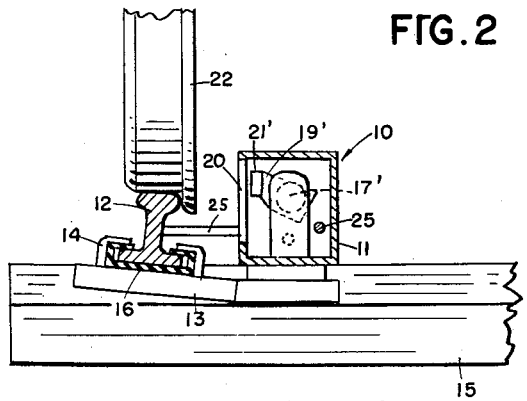
FIG. 3 is a cross-sectional view taken along line III—III of FIG. 1.

In FIGS. 1–3 we show an axle counter 10 comprising a housing 11 which is secured to a rail 12 by means of support bars 13 whose clamps 14 engage the rail 12 between its sleepers 15. The housing 11 is electrically insulated from the rail 12 by dielectric spacers 16 interposed between the support bars 13 and the rail. A pair of exciting magnets 17' and 17", which may be of either the permanent-magnet or the electromagnet type, are supported along the inner side of rail 12 by two U-shaped brackets 18', 18" secured to the housing. Each magnet is provided with a respective pair of pole pieces 19' and 19" which are separated by an air gap, via opening 20 in housing 11, from the rail 12 and the path of the inner flange of a railroad wheel 22 passing along the track. The magnets are positioned so that the flange may cut the flux in the vicinity of each pole. A pair of detecting devices 21′ are disposed in the air gap between the poles 19′ and the rail 12 while another pair of detecting devices 21″ are disposed in the gap between the poles 19″ and the rail. As illustrated in FIGS. 2 and 3, these detecting devices may be carried directly on their respective pole pieces. Circuit connections to the detectors 21′, 21″ may be made through a socket 26 on housing 11.

The brackets 18′, 18″ also carry threaded rods 23′ and 23″, respectively, along which slugs 24′ and 24″ may be adjustably displaced. The slugs 24′ and 24″ are composed of a magnetic or magnetizable material capable of influencing the stray fields of the respective magnets 17′, 17″ in a manner designed to provide exact balance between the outputs of each pair of detecting devices 21′ or 21″ in the absence of a wheel 22.

A metal bar 25, conductively connected to the rail 12 forwardly and rearwardly of the exciting magnets 17′, 17″, forms a geometrically parallel shunt path with the rail in the vicinity of the exciting magnetic field. The impedance of the bar 25 is chosen to equal that of the portion of the rail bridged by it so that currents flowing through the rail may be equally divided between the two parallel conducting paths on either side of the exciting magnets. The magnetic fields arising from the current flow through the rail and the bar 25 thus substantially neutralize each other. Since the current division between the rail 12 and the bar 25 is substantially constant, changes in the current flow which lead to field variations do not affect the exciting fields.

Figure 4A:
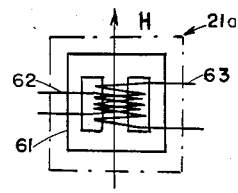
FIG. 4A is a schematic representation of a transducer adapted to be used as a detecting device in the system of FIGS. 1–3.

Each detecting device 21′, 21″ may be a saturable-core transformer of the type schematically shown at 21a in FIG. 4A. A closed three-limb saturable core 61 is provided with a primary winding 62 and a secondary winding 63 wound concentrically on the center limb. The transformer 21a is positioned in the exciting magnetic field so that the flux lines of the latter lie in the direction of the arrow H. The exciting magnetic field will then tend to pre-saturate the core 61 whereby only alternate half-cycles of the primary current will be effective to induce an alternating voltage in the secondary winding. When the flange of a wheel passes through the magnetic field in the vicinity of the device 21a, the field intensity in this region increases and the unidirectional biasing flux in the core 61 assumes such a magnitude that the output voltage of the transformer is substantially completely suppressed.

Figure 5:
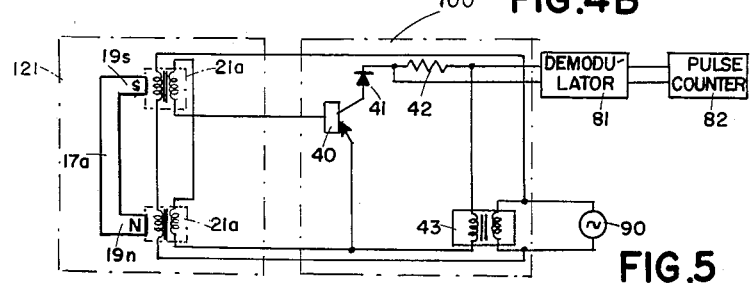
FIG. 5 is a circuit diagram of a non-directional axle counter according to the invention.
Figure 8:
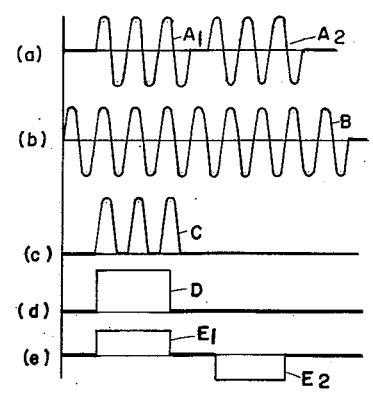
FIG. 8 is a graph of intermediate and final output pulses produced by the circuit of FIG. 5.

In FIG. 5, a detector 121 comprising two transducers 21a is shown to be disposed in the flux of a magnet 17a (similar to each of the magnets 17′ and 17″ of FIGS. 1–3) adjacent its north pole 19n and its south pole 19s, respectively. The primary windings connected in series-aiding relationship, i.e. with their alternating fields augmenting and reducing the biasing flux through their respective cores in the same rhythm, across the output of an alternating-current source 90 having a frequency preferably in excess of 100 cycles per second. The secondary windings of the transducers 21a are connected in series-opposed relationship across the base-emitter circuit of a common-emitter transistor amplifier 40, forming part of a phase discriminator 100, whose collector-emitter circuit includes a rectifier 41, a load resistor 42, and the secondary winding of a driving transformer 43 which is fed by the generator 90. As there is normally no output from the transducers 21a, the resistance of the transistor 40 is high and only a small pulsating current traverses rectifier 41 and load resistor 42. When the transducers are unbalanced by the passage of a wheel as previously described, they produce two short pulse trains $A_1$ and $A_2$, FIG. 8(a), of which one will be in phase and one in phase opposition with respect to the driving voltage B, FIG. 8(b). The in-phase pulse train, e.g. the first train $A_1$ as shown in FIG. 8, energizes the transistor 40 to produce a train of unipolar pulses C, FIG. 8(c), in its collector circuit which includes the resistor 42. The voltage drop developed across this resistor is fed to a demodulator 81 which detects the envelope of the pulse train C and converts it into a single rectangular pulse D, FIG. 8(d), for stepping pulse counter 82.

Figure 6:
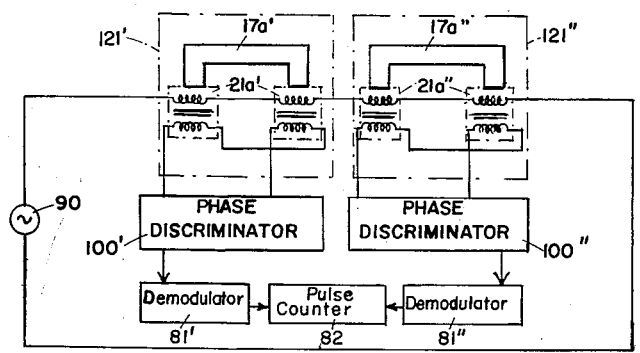
FIG. 6 is a simplified circuit diagram of a directional axle counter employing transducers of the type illustrated in FIG. 4A.

In FIG. 6 we show two juxtaposed detectors 121′, 121″ whose transformers 21a′ and 21a″, respectively biased by magnets 17a′, 17a″ and driven from a common source 90, work into respective phase discriminators 100′ and 100″. Each of these discriminators is of the type shown in FIG. 5 and, via a respective demodulator 81′, 81″, triggers a common pulse counter 82. This counter is adapted, in a manner known per se, to distinguish between trains moving in opposite directions in accordance with the order of occurrence of pulses from demodulators 81′ and 81″.

Figure 4B:
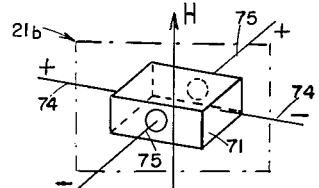
FIG. 4B is a view similar to FIG. 4A of another transducer capable of being so employed.

In FIG. 4B we show, schematically, a detecting device 21b which comprises a Hall-effect crystal 71. The crystal, which may be any one of several suitable semiconductors (e.g. gallium arsenide, indium antimonide, and germanium-silicon alloys), is energizable via input electrodes 74 and has a pair of output electrodes 75 across which a potential difference of the indicated polarity is developed when a magnetic flux passes through the crystal in the direction denoted by arrow H.

Figure 7:
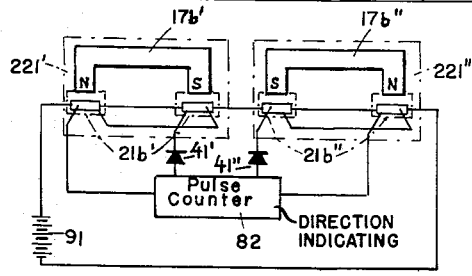
FIG. 7 is a similar circuit diagram of a directional axle counter employing transducers of the type illustrated in FIG. 4B.

FIG. 7 shows two juxtaposed detectors 221′, 221″ each including two balanced transducers 21b′ and 21b″, of the type illustrated in FIG. 4B, adjacent the poles of their respective magnets 17b′ and 17b″. Rectifiers 41′, 41″ serve to select one of two voltage pulses $E_1$ and $E_2$, FIG. 8(e), of opposite polarity which are produced by each transducer pair upon the passage of a wheel. The pulses so selected are fed to the direction-indicating counter 82. The cells are energized in series-aiding relationship, having regard to the polarity of the steady biasing flux therethrough, from a source of direct current shown as a battery 91. Again, if directional indication is not required, one of the detectors 221′, 221″ may be omitted.

The invention described and illustrated is believed to admit of many modifications and variations which are within the ability of persons skilled in the art and which are intended to be embraced in the spirit and scope of the invention as defined in the appended claims.

We claim:
1. An axle counter for railroad installations, comprising an elongated magnet positioned alongside a rail for producing a unidirectional flux through said rail in the region of passage of a wheel over said rail, a pair of electromagnetic transducers spacedly positioned along the rail in air gaps between said rail and respective poles of said magnet, signaling means controllable by said transducers, and circuit means connecting said transducers to said signaling means in balanced relationship for energizing said signaling means only upon the presence of an extraneous body of magnetic permeability different from unity within one of said air gaps.

2. An axle counter for railroad installations, comprising a pair of elongated magnets alignedly positioned alongside a rail for establishing two closed paths for unidirectional flux through said rail in the region of passage of a wheel over said rail, two pairs of electromagnetic transducers spacedly positioned along the rail in air gaps between said rail and the poles of each of said magnets, respectively, circuit means interconnecting the transducers of each pair in balanced relationship for producing an output signal only upon the presence of an extraneous body of magnetic permeability different from unity within one of said air gaps, and direction-indicating counter means connected to said circuit means for control by said output signal.

3. An axle counter for railroad installations, comprising magnet means positioned adjacent a rail for producing a unidirectional flux through said rail in the region of passage of a wheel over said rail, a pair of electromagnetic transducers spacedly positioned along the rail in air gaps between said rail and respective poles of said magnet means, signaling means controllable by said transducers, circuit means connecting said transducers to said signaling means in balanced relationship for energizing said signaling means only upon the presence of an extraneous body of magnetic permeability different from unity within one of said air gaps, and a conductive shunt connected across a portion of said rail and extending substantially parallel to said portion, said shunt having an impedance substantially identical with that of said portion, said magnet means being located in the region encompassed by said portion and said shunt.

4. An axle counter for railroad installations, comprising an elongated magnet positioned alongside a rail for producing a unidirectional flux through said rail in the region of passage of a wheel over said rail, a pair of electromagnetic transducers spacedly positioned along the rail in air gaps between said rail and respective poles of said magnet, signaling means controllable by said transducers, circuit means connecting said transducers to said signaling means in balanced relationship for energizing said signaling means only upon the presence of an extraneous body of magnetic permeability different from unity within one of said air gaps, and a conductive shunt connected across a portion of said rail and extending substantially parallel to said portion, said shunt having an impedance substantially identical with that of said portion, said magnet being located in the region encompassed by said portion and said shunt.

5. An axle counter for railroad installations, comprising a pair of elongated magnets alignedly positioned alongside a rail for establishing two closed paths for unidirectional flux through said rail in the region of passage of a wheel over said rail, two pairs of electromagnetic transducers spacedly positioned along the rail in air gaps between said rail and the poles of each of said magnets, respectively, circuit means interconnecting the transducers of each pair in balanced relationship for producing an output signal only upon the presence of an extraneous body of magnetic permeability different from unity within one of said air gaps, direction-indicating counter means connected to said circuit means for control by said output signal, and a conductive shunt connected across a portion of said rail and extending substantially parallel to said portion, said shunt having an impedance substantially identical with that of said portion, said magnets being located in the region encompassed by said portion and said shunt.

6. An axle counter for railroad installations, comprising magnet means positioned adjacent a rail for producing a unidirectional flux through said rail in the region of passage of a wheel over said rail, a pair of electromagnetic transducers spacedly positioned along the rail in air gaps between said rail and respective poles of said magnet means, signaling means controllable by said transducers, circuit means connecting said transducers to said signaling means in balanced relationship for energizing said signaling means only upon the presence of an extraneous body of magnetic permeability different from unity within one of said air gaps, and magnetic trimmer means adjustably positioned in the stray field of said magnet means for equalizing the individual outputs of said transducers in the absence of an extraneous body.

7. An axle counter for railroad installations, comprising an elongated magnet positioned alongside a rail for producing a unidirectional flux through said rail in the region of passage of a wheel over said rail, a pair of electromagnetic transducers spacedly positioned along the rail in air gaps between said rail and respective poles of said magnet, signaling means controllable by said transducers, circuit means connecting said transducers to said signaling means in balanced relationship for energizing said signaling means only upon the presence of an extraneous body of magnetic permeability different from unity within one of said air gaps, guide means extending alongside said magnet, and a ferromagnetic slug displaceable along said guide means for equalizing the individual outputs of said transducers in the absence of an extraneous body.

8. An axle counter for railroad installations, comprising a pair of elongated magnets alignedly positioned alongside a rail for establishing two closed paths for unidirectional flux through said rail in the region of passage of a wheel over said rail, two pairs of electromagnetic transducers spacedly positioned along the rail in air gaps between said rail and the poles of each of said magnets, respectively, circuit means interconnecting the transducers of each pair in balanced relationship for producing an output signal only upon the presence of an extraneous body of magnetic permeability different from unity within one of said air gaps, direction-indicating counter means connected to said circuit means for control by said output signal, guide means extending alongside each of said magnets, and a respective ferromagnetic slug displaceable along said guide means for equalizing the individual outputs of the transducers of each pair in the absence of an extraneous body.

9. An axle counter for railroad installations, comprising magnet means positioned adjacent a rail for producing a unidirectional flux through said rail in the region of passage of a wheel over said rail, a pair of electromagnetic transducers spacedly positioned along the rail in air gaps between said rail and respective poles of said magnet means, signaling means controllable by said transducers, circuit means connecting said transducers to said signaling means in balanced relationship for energizing said signaling means only upon the presence of an extraneous body of magnetic permeability different from unity within one of said air gaps, a conductive shunt connected across a portion of said rail and extending substantially parallel to said portion, said shunt having an impedance substantially identical with that of said portion, said magnet means being located in the region encompassed by said portion and said shunt, and magnetic trimmer means adjustably positioned in the stray field of said magnet means for equalizing the individual outputs of said transducers in the absence of an extraneous body.

10. An axle counter for railroad installations, comprising an elongated magnet positioned alongside a rail for producing a unidirectional flux through said rail in the region of passage of a wheel over said rail, a pair of electromagnetic transducers spacedly positioned along the rail in air gaps between said rail and respective poles of said magnet, signaling means controllable by said transducers, circuit means connecting said transducers to said signaling means in balanced relationship for energizing said signaling means only upon the presence of an extraneous body of magnetic permeability different from unity within one of said air gaps, a conductive shunt connected across a portion of said rail and extending substantially parallel to said portion, said shunt having an impedance substantially identical with that of said portion, said magnet being located in the region encompassed by said portion and said shunt, guide means extending alongside said magnet, and a ferromagnetic slug displaceable along said guide means for equalizing the individual outputs of said transducers in the absence of an extraneous body.

11. An axle counter for railroad installations, comprising a pair of elongated magnets alignedly positioned alongside a rail for establishing two closed paths for unidirectional flux through said rail in the region of passage of a wheel over said rail, two pairs of electromagnetic transducers spacedly positioned along the rail in air gaps between said rail and the poles of each of said magnets, respectively, circuit means interconnecting the transducers of each pair in balanced relationship for producing an output signal only upon the presence of an extraneous body of magnetic permeability different from unity within one of said air gaps, direction-indicating counter means connected to said circuit means for control by said output signal, a conductive shunt connected across a portion of said rail and extending substantially parallel to said portion, said shunt having an impedance substantially identical with that of said portion, said magnets being located in the region encompassed by said portion and said shunt, guide means extending alongside each of said magnets, and a respective ferromagnetic slug displaceable along said guide means for equalizing the individual outputs of the transducers of each pair in the absence of an extraneous body.

References Cited in the file of this patent

FOREIGN PATENTS

| | | |
|---|---|---|
| 544,285 | Canada | July 30, 1957 |
| 683,022 | Great Britain | Nov. 19, 1952 |

OTHER REFERENCES

The Railway Gazette, May 31, 1940, pages 765 and 766, Div. 34.